(12) United States Patent
Yu et al.

(10) Patent No.: US 9,674,323 B1
(45) Date of Patent: Jun. 6, 2017

(54) MODULAR MULTI-FUNCTIONAL DEVICE, METHOD, AND SYSTEM

(71) Applicants: George Yu, Chattanooga, TN (US); Wade Chester Gasior, Chattanooga, TN (US)

(72) Inventors: George Yu, Chattanooga, TN (US); Wade Chester Gasior, Chattanooga, TN (US)

(73) Assignee: VARIABLE, INC., Chattanooga, TN (US)

( * ) Notice: Subject to any disclaimer, the term of this patent is extended or adjusted under 35 U.S.C. 154(b) by 195 days.

(21) Appl. No.: 14/014,312

(22) Filed: Aug. 29, 2013

(51) Int. Cl.
| | |
|---|---|
| H04M 1/02 | (2006.01) |
| H04M 1/725 | (2006.01) |
| H04M 1/60 | (2006.01) |
| H04W 88/02 | (2009.01) |

(52) U.S. Cl.
CPC ....... *H04M 1/0274* (2013.01); *H04M 1/6041* (2013.01); *H04M 1/7253* (2013.01); *H04W 88/02* (2013.01)

(58) Field of Classification Search
None
See application file for complete search history.

(56) References Cited

U.S. PATENT DOCUMENTS

| | | | |
|---|---|---|---|
| 5,070,732 A | 12/1991 | Duncan et al. | |
| 5,347,476 A * | 9/1994 | McBean, Sr. | G01D 3/022 324/174 |
| 5,959,529 A | 9/1999 | Kail, IV | |
| 6,396,416 B1 | 5/2002 | Kuusela et al. | |
| 6,553,336 B1 | 4/2003 | Johnson et al. | |
| 6,584,435 B2 | 6/2003 | Mestha et al. | |
| 6,720,887 B1 | 4/2004 | Zunti | |
| 6,978,217 B2 | 12/2005 | Morozumi et al. | |
| 7,283,238 B2 | 10/2007 | Simons et al. | |
| 7,557,925 B2 | 7/2009 | Nisper et al. | |
| 7,944,561 B2 | 5/2011 | Nisper et al. | |
| 8,008,613 B2 | 8/2011 | Tam | |
| 8,139,220 B2 | 3/2012 | Peterson et al. | |

(Continued)

FOREIGN PATENT DOCUMENTS

| | | |
|---|---|---|
| CN | 101055206 | 10/2007 |
| CN | 102193628 | 9/2011 |

(Continued)

OTHER PUBLICATIONS http://spyder.datacolor.com/portfolio-view/spyder4elite/ obtained from https://archive.org/web/ as it appeared on Apr. 7, 2012.

(Continued)

*Primary Examiner* — Ankur Jain
*Assistant Examiner* — Zhitong Chen
(74) *Attorney, Agent, or Firm* — Patterson Intellectual Property Law, P.C.; Gary L. Montle

(57) ABSTRACT

A multi-functional portable device that connects to and communicates with one or more modular units designed to provide different functionality. The multi-functional portable device of the present invention may communicate with a user computing device. The multi-functional portable device may be employed in various methods and systems used for interacting with and acquiring information from the surrounding environment.

18 Claims, 14 Drawing Sheets

(56) References Cited

U.S. PATENT DOCUMENTS

| | | | |
|---|---|---|---|
| 8,237,138 | B2 | 8/2012 | Nisper et al. |
| 8,271,021 | B2 | 9/2012 | Jeong |
| 8,345,252 | B2 | 1/2013 | Nisper et al. |
| 8,441,642 | B2 | 5/2013 | Wegmuller et al. |
| 2002/0159066 | A1 | 10/2002 | Berstis |
| 2004/0266480 | A1* | 12/2004 | Hjelt ............... G06F 1/1632 455/558 |
| 2006/0181407 | A1* | 8/2006 | Tice ............... G08B 17/00 340/522 |
| 2006/0289658 | A1* | 12/2006 | Fischer ............... G06F 21/73 235/492 |
| 2007/0035554 | A1 | 2/2007 | McClanahan |
| 2008/0013077 | A1 | 1/2008 | Orelli et al. |
| 2008/0259336 | A1 | 10/2008 | Konno et al. |
| 2009/0052771 | A1* | 2/2009 | Ohga ............... H04N 1/603 382/165 |
| 2009/0058663 | A1* | 3/2009 | Joshi et al. ............... 340/584 |
| 2009/0083459 | A1 | 3/2009 | Harish |
| 2009/0127431 | A1* | 5/2009 | Helbing ............... G01J 1/32 250/205 |
| 2010/0295942 | A1* | 11/2010 | Jekel ............... F41G 3/26 348/139 |
| 2011/0050892 | A1 | 3/2011 | Zind et al. |
| 2011/0075146 | A1* | 3/2011 | Moroney ............... G01J 3/02 356/402 |
| 2011/0201382 | A1 | 8/2011 | Hsiao |
| 2011/0215997 | A1 | 9/2011 | Kim |
| 2012/0250020 | A1 | 10/2012 | Hastings et al. |
| 2012/0290268 | A1 | 11/2012 | Bey et al. |
| 2013/0042295 | A1* | 2/2013 | Kelly ............... G06F 21/53 726/1 |

FOREIGN PATENT DOCUMENTS

| | | |
|---|---|---|
| JP | 2012065192 | 3/2012 |
| KR | 20070111671 | 11/2007 |

OTHER PUBLICATIONS http://www.hitedinic.com/cgi-bin/commece.cgi?preadd=-action&key=NC01038 (available Jul. 27, 2015).

http://www.emxinc.com/industrial.html (accessed Jul. 27, 2015).

Brian Heater: "Node Modular iOS Sensor Hands-On", Oct. 20, 2012, XP002763666, 6 pp., retrieved from the Internet on Oct. 31, 2016.

Supplementary European Search Report in European Patent Application No. EP 13 85 0063, dated Oct. 31, 2106, 11 pp.

State Intellectual Property Office, P.R. China: First Office Action dated May 3, 2016 in re: Patent Application No. 2013800624943.0, filed Nov. 4, 2013.

Korean Intellectual Property Office—International Application Division, Notification of Transmittal of the International Search Report and the Written Opinion of the International searching Authority, PCT/US2015/028861, mailed Jan. 27, 2016, 10 pages.

Nektarios A. Valous et al., "Colour Calibration of a Laboratory Computer Vision System for Quality Evaluation of Pre-sliced Hams," Meat Science, Jan. 31, 2009, vol. 81, Issue 1, pp. 132-141.

\* cited by examiner

MODULAR MULTI-FUNCTIONAL DEVICE, METHOD, AND SYSTEM

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

BACKGROUND OF THE INVENTION

The present invention relates generally to the use of modular units with a core device in communication with a user computing device. More particularly, this invention pertains to a modular multi-functional device, method, and system for interacting with and acquiring information related to the surrounding environment.

There are at present an extremely large number of applications being implemented on mobile computing devices such as cell phones, and that number is growing rapidly in view of the changing needs and desires of the marketplace. However, there are only a limited number and types of sensors, controllers, and actuators on a cell phone. For example, cell phones can typically only measure location, motion, orientation, ambient light, sounds, and video. Thereby, the applications on cell phones can only take advantage of existing hardware on the cellphone.

External sensors can be provided or otherwise implemented to communicate wirelessly with cellphones and thereby expand the hardware capabilities of the cellphone. However, the currently available external sensor devices are purpose built and application specific. There is no universal external device with plug-and-play ports to allow interchangeable plug-in sensor, controller, and actuator modular units.

Further, all current wireless devices for cell phones contain a fixed set of functionality and typically are application specific. If the user wants to utilize a different set of sensors or actuators, then he/she has to use a completely different device.

It would be desirable in view of present needs and the known architecture for executing mobile applications to provide a system with a common set of basic components requiring only the application specific plug-in modular unit to differ from application to application.

BRIEF SUMMARY OF THE INVENTION

Aspects of the present invention provide a modular multi-functional portable device having a housing that includes an interior and an exterior. The portable device has a connection port disposed on the exterior of the housing, the connection port having an electrical connector configured to interface with an electrical connector of one of a plurality of unique modular units. The portable device also has a controller disposed within the interior of the housing, the controller effective to receive a signal that identifies one of a plurality of unique modular units, and the controller effective to execute a unique set of instructions based on the identification of the one of a plurality of unique modular units. The portable device also has a communications unit disposed within the interior of the housing functionally linked to a communications network.

In one aspect, a system is operable to receive environmental data and provide a user with targeted information. The system includes a portable device including a connection port disposed on the exterior of the housing, the connection port having an electrical connector configured to interface with an electrical connector of one of a plurality of unique modular units. The portable device has a controller and a communications unit. The modular unit that is part of the system has an electrical connector.

In another aspect, a system for the measurement of environmental stimuli and to provide a user with targeted information is provided. The system includes a modular unit and a portable device having a connection port configured to receive the modular unit and a transceiver. The system also includes a mobile communication device having a display. The modular unit includes a controller effective to generate a unique identification signal, and the portable device includes a controller effective to receive the unique identification signal generated by the modular unit when the modular unit is coupled to the portable device, and to direct the transceiver to transmit an identification signal over a communications network to the mobile communication device, the identification signal effective to identify the modular unit that is coupled to the portable device. The mobile communication device of the system is configured to receive the identification signal. The mobile communication device of the system also includes a computer readable medium having software residing thereon, the software executable to direct the performance of generating a graphical user interface on the display of the mobile communication device in response to the identification signal and executable to enable or disable the selection of user commands based on the identification signal.

In another aspect, a system for the measurement of environmental data and to provide a user with targeted information is provided. The system includes a portable electronic device having a controller and a transceiver. The system also includes a plurality of modular units, each modular unit having a controller and each modular unit configured to couple to the portable electronic device. The portable device includes a mobile communication device. The controller of the portable electronic device of the system is effective to receive identification signals generated by each controller of each of the plurality of modular units. The controller of the portable electronic device is also configured to execute a unique set of instructions based on the identification of a particular combination of modular units coupled to the portable electronic device.

BRIEF DESCRIPTION OF THE SEVERAL VIEWS OF THE DRAWINGS

Reference will now be made in detail to optional embodiments of the invention, examples of which are illustrated in accompanying drawings. Whenever possible, the same reference numbers are used in the drawing and in the description referring to the same or like parts.

DETAILED DESCRIPTION OF THE INVENTION

Figure 1:
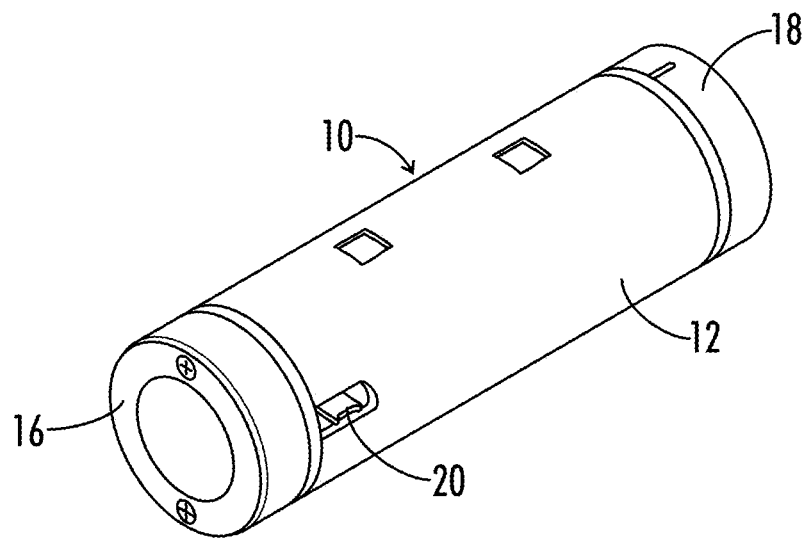
FIG. 1 illustrates a perspective view of an embodiment of the modular multi-functional portable device of the present invention.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

Throughout this specification, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may. The term "coupled" means at least either a direct electrical connection between the connected items or an indirect connection through one or more passive or active intermediary devices, including a wireless connection. Terms such as "providing," "processing," "supplying," "determining," "calculating" or the like may refer at least to an action of a computer system, computer program, signal processor, logic or alternative analog or digital electronic device that may be transformative of signals represented as physical quantities, whether automatically or manually initiated.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The terms "controller," "chip" "control circuit" and "control circuitry" may be used herein to refer to a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

Further, the various illustrative logical blocks, modules, circuits, and algorithm steps described herein may be implemented as electronic hardware, computer software, or combinations of both, depending on the application and functionality. A software module or executable code may reside in RAM memory, flash memory, ROM memory, EPROM memory, EEPROM memory, registers, hard disk, a removable disk, a CD-ROM, or any other form of a non-transitory computer-readable medium known in the art. An exemplary computer-readable medium can be coupled to the processor such that the processor can read information from, and write information to, the memory/storage medium. In the alternative, the medium can be integral to the processor. The processor and the medium can reside in an ASIC. The ASIC can reside in a user terminal. In the alternative, the processor and the medium can reside as discrete components in a user terminal.

It will be understood by those of skill in the art that information and signals may be represented using any of a variety of different technologies and techniques (e.g., data, instructions, commands, information, signals, and bits may be represented by voltages, currents, electromagnetic waves, magnetic fields or particles, optical fields or particles, or any combination thereof).

The term "communications network" as used herein with respect to data communication between two or more parties or otherwise between communications network interfaces associated with two or more parties may refer to any one of, or a combination of any two or more of, telecommunications networks (whether wired, wireless, cellular or the like), a global network such as the Internet, local networks, network links, Internet Service Providers (ISP's), and intermediate communication interfaces.

The present invention is directed toward a multi-functional portable device that connects to and communicates with one or more modular units designed to provide different functionality and methods and systems thereto. The multi-functional portable device of the present invention may also communicate with a user computing device.

Referring to the attached Figures, an exemplary embodiment of the present invention may now be described in greater detail. Where the various figures may describe embodiments sharing various common elements and features with other embodiments, similar elements and features are given the same reference numerals and redundant description thereof may be omitted below.

The Device's Core and the Modular Unit

Figure 2:
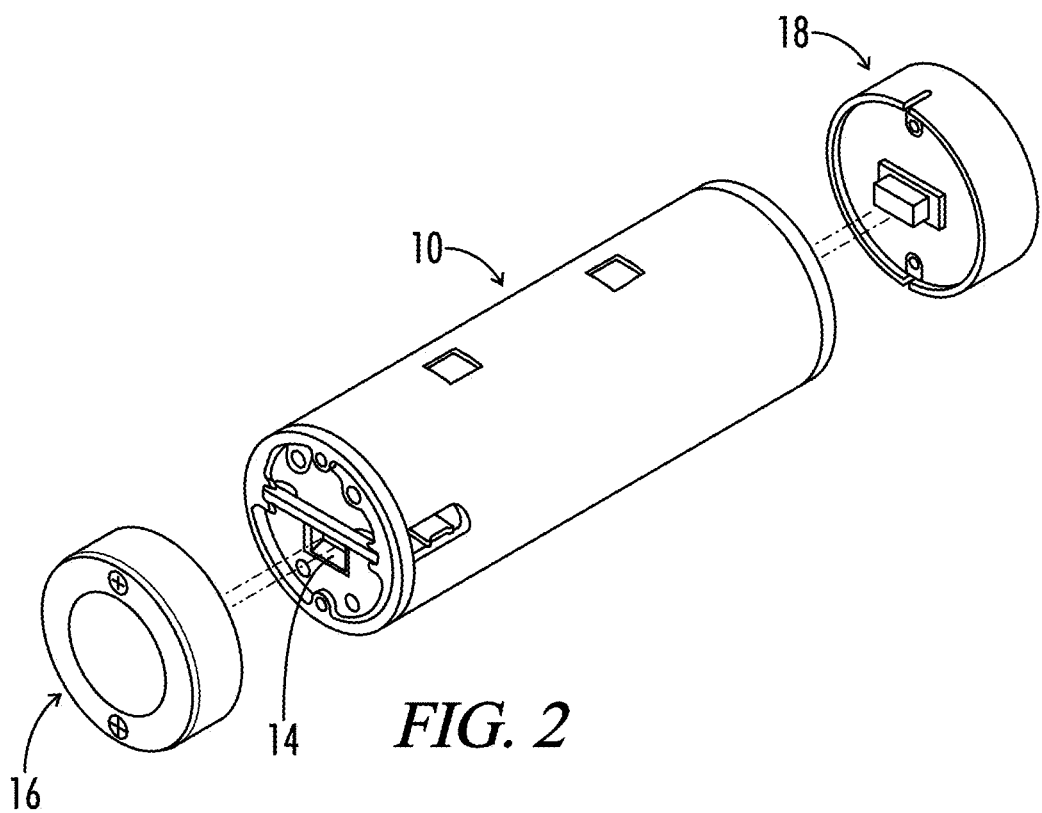
FIG. 2 depicts an exploded view of an embodiment of the modular multi-functional portable device of the present invention.

As shown in FIGS. 1 and 2, the multi-function portable device 10 described herein (also referred to as the "core device" or "master unit") may include a housing 12 that has an exterior and an interior. The core of the modular multi-functional portable device of the present invention resides within the housing 10. An interchangeable modular unit 16 may be attached to either end of the portable device 10 via a connection port or modular port 14.

Figure 15:
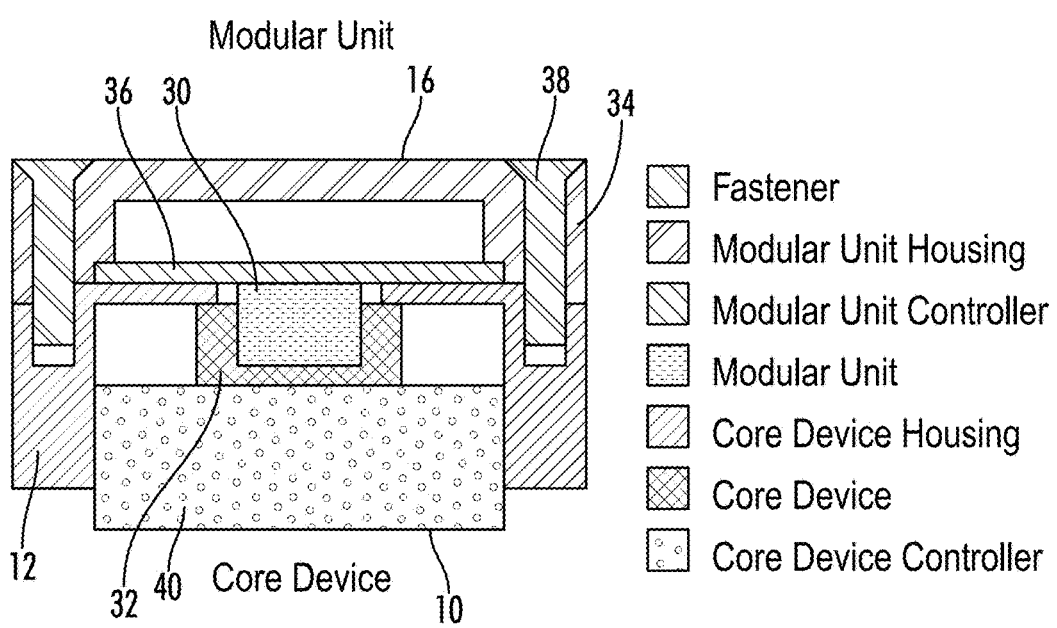
FIG. 15 illustrates a physical connection via electrical connectors between the core device and a modular unit.

A modular unit 16 may be configured to operate only after physically coupling the modular unit 16 to the portable device 10 via an electrical connector (e.g. detachably coupling the core device to an engagement surface). For example, as shown in FIG. 15, a modular unit 16 may be connected using a male connector 30 that plugs into a matching female connector 32 on the core device 10. The connector may provide a mechanical and electrical connection. A modular unit housing 34 that independently connects to the core device housing 12 may surround the circuitry of the modular unit (i.e. controller). The modular unit housing 34 may tightly press the modular unit controller 36 against the core device 10 and may also prevent any lateral movement by pressing against the modular unit controller 36 from the sides. The modular unit housing 34 may be further stabilized using a fastener 38 to fasten the modular unit housing 34 to the core device housing 12.

The modular unit 16 may also be configured to operate independently of a physical connection to the portable device, for example by having an independent power source and by communicating wirelessly with the portable device 10 via a wireless connection port using a number of wireless communication mechanisms known in the art. A modular unit may also reside within the housing 12 of the core device 10.

The interchangeable modular unit may be a sensor 18, and thus it is understood that references to the modular unit herein include all types of modular units described below, including a sensor 18. The combination of a core device and a modular unit may be referred to as a sensing device. In a particular embodiment of the present invention, the core device is a NODE Kore as offered by Variable Technologies.

Controller

Both the core device 10 and the modular unit 16 may include a controller. The controller may interact with and provide functionality to the various components discussed herein. The controller may interact, process instructions, and provide commands to the communications unit and the power supply described below. The controller may be capable of generating or receiving a unique identification signal. The controller may also be capable of employing an event driven processing method that allows the controller to be in low power sleep mode. The controller may remain in low power sleep mode until an event is generated by a radio signal, a preset timer, or otherwise by a modular unit, such as a sensor.

Power

Both the core device 10 and the modular unit 16 may include an internal power supply or use an external power supply. The core device 10 may provide power to the modular unit 16 or the modular unit 16 may also include a power supply. Electrical power may be transferred from the core device 10 to the modular unit 16 or from the modular unit 16 to the core device 10 through an electrical connector. For example, the process of providing power to the modular unit 16 from the core device 10 may be accomplished with a switching element on the core device 10, as further described below. In response to activation of the switching element and upon command from the core device controller 40, power can be provided to the modular unit 16. The power supply can be any power supply known in the art, including a solar power supply having a solar panel or panels that convert light energy into electrical energy, a primary or secondary battery (i.e. rechargeable), or an AC or DC power supply.

Both the core device 10 and the modular unit 16 may also include a charge port for charging the device in the event a chargeable power supply is implemented. A charging voltage may be provided to a charging voltage bus line of the controller. The modular unit 16 may also provide power to the core device 10 to supplement or charge the power supply of the core device 10. In FIG. 1, a charge port 20 is shown for charging the core device 10. In one embodiment of the invention a rechargeable Li-Polymor battery is used which can be charged via a Mirco-USB port. The core device 10 may include a switching element to activate and deactivate only the core device 10 or both the core device 10 and one or more modular units 16. It is understood that the term "switching element" includes a means effective to switch a signal provided to a controller. The switching element, therefore, may include a mechanism to enable operation of the switch, including the means necessary to enable voice, a physical mechanism, or various process variables to cause a switch. The switching element may include, for example, a push button switch, a voice command operated switch, or a slide switch. Many other switching elements are known in the art and will be readily familiar to the skilled artisan. When the core device has a switching element, the switching element may be partially disposed on the exterior of the housing 12. Likewise, the modular unit 16 may include a switching element. In one embodiment, the means necessary to cause a switch may be the only mechanism disposed on the exterior of the housing 12 to ease the operation of the device.

Communications Unit

The core device or the modular unit may also include a communications unit. The communications unit communicates with the controller and with any user computing device in communication with the controller, as further described below The communications unit may include a transceiver for transmitting and receiving communication signals. The communications unit may enable communication between electric signals or wireless signals. The communications unit may be directed by the controller and may be capable of sending and encrypting a unique identification signal received from the controller to a user computing device. The communications unit of the modular unit may communicate with the communications unit of the core device using a variety of serial communication methods known in the art and may also enable encryption of an identification signal using an encryption key. The communications unit may use multiple cryptographic techniques and/or algorithms to encrypt communications. For example, in an embodiment, a modular unit may include a CryptoAuthentication chip or the equivalent ("ID chip") as part of the controller of the modular unit or separate from the controller of the modular unit but in communication with the controller. The ID chip may enable restricting use of a modular unit with respect to the core device or any other proprietary system as desired. This chip may also further enable storage of unique calibration information for each modular unit. The modular unit may also contain an ID resistor which divides the power bus voltage with a reference resistor from the core device. The resulting divided voltage value may be measured by the core device. The existence of the modular unit ID resistor may allow the core device to determine if a modular unit is connected. The value of the modular unit ID resistor may also identify the communication method and speed of the modular unit to the core device. Upon detection of a connected modular unit by the core device, the core device may provide power to the modular unit in order to communicate with the ID chip to authenticate the modular unit as well as identify its capability. If several ID attempts have resulted in failure, the power to a modular unit may be disabled.

Inertial Measurement Unit

The device according to the present invention may have an inertial measurement unit contained within the housing of the multi-functional portable device. The inertial measurement unit may also be contained within a modular unit. The inertial measurement unit may be used to track the orientation of the device. The inertial measurement unit may include an accelerometer, a gyroscope, or a magnetometer (e.g. a 3-axis accelerometer, a 3-axis gyroscope, or a 3-axis magnetometer) and may be capable of measuring nine (9) degrees of freedom. The inertial measurement unit may be used to verify whether the core device is stationary or may be able to sense any motion occurring while measurements are being taken by one of the modular units.

Thermal Sensor Modular Unit

One of the modular units of the present invention may be a thermal sensor modular unit, which may include a thermal camera and/or an infrared thermometer. The thermal sensor modular unit may be used, for example, to check the exterior temperature of food products; test a home insulation value in hard to reach places; monitor the temperature of a barbecue grill from a distance; monitor temperatures in a refrigerator or freezer; compare the temperature of a tool, engine, or stovetop; or to test water temperatures in various beverages, baby bottles, a swimming pool, a hot tub, or a bath. In a particular embodiment of the present invention, the thermal sensor modular unit is a NODE THERMA as offered by Variable Technologies.

Gas Sensor Modular Unit

One of the modular units of the present invention may be a gas sensor unit, which may include a carbon monoxide sensor, a nitric oxide sensor, a nitrogen dioxide sensor, a chlorine gas sensor, a sulfur dioxide sensor, or a hydrogen sulfide sensor. The gas sensor may be, for example, an electrochemical gas sensor and may be used to detect and measure both ambient and toxic levels of gas. It is preferable that the gas sensors used in the gas sensor unit be industrial grade sensors, although other sensors may be employed and still fall within the scope of the present invention. In a particular embodiment of the present invention, the gas sensor modular unit is a NODE OXA as offered by Variable Technologies.

Light Source Modular Unit

One of the modular units of the present invention may be a light source modular unit, which may include one or more light emitting devices such as fluorescent lamps, high intensity discharge lamps, incandescent bulbs, and solid state light-emitting elements such as light emitting diodes ("LEDs"), or organic light emitting diodes ("OLEDs"). The light source modular unit may be powered on and off and may cycle through various levels of brightness via the switching element. The light source modular unit may be used in connection with the core device as a flashlight. For example, the light source modular unit may be used by a home inspector who needs to brighten an area while using another modular unit to collect environmental information. In a particular embodiment of the present invention, the light source modular unit is a NODE LUMA LED as offered by Variable Technologies.

Color Sensor Modular Unit

One of the modular units of the present invention may be a color sensor unit, which may include a color sensor controller that further includes a color sensing array of photodiodes with red, green, blue, clear, etc. The color sensor may have options for controlling gain, prescaler, and integration time—all of which may typically be used for fine-tuning the sensor for a given environment. A rubber cover with for example a 1.0 mm to 1.59 mm aperture hole may be provided to further allow only reflected light from a color sample in to the color sensor array. A clear epoxy lens on the rubber cover may be provided in order to isolate the sensor from dust, moisture, and other external elements while still allowing light in for accurate color measurement. The color sensor unit may include the ability to obtain a color reading showing information in CIE XYZ (Tristimulus), CIE L*a*b*, RGB, and other formats as are known in the art via mathematical conversion based on a priori calibration using the MacBeth ColorChecker.

More generally, an example of a color-sensing modular unit according to various embodiments of the present invention includes a color sensor, a light source for illuminating a target surface of interest and a housing effective to restrict (ideally, to prevent) ambient light and otherwise enable only light radiated from the light source and reflected back from the target surface of interest to be received by the color sensor. The light source may include a plurality (e.g., eight) light-emitting diodes (LEDs) that provide or otherwise collectively define a controlled 6500 Kelvin light source to shine on a color sample. A clear cover over the LEDs may be provided in order to reduce glare and focus light on the target surface of interest. A black plastic shroud around the outside of the modular unit may be provided to block out ambient light and prevents scratches of the colored surface of interest. In a particular embodiment of the present invention, the color sensor modular unit is a NODE CHROMA as offered by Variable Technologies.

Climate Sensor Modular Unit

One of the modular units of the present invention may be a climate sensor unit, which may include a humidity, temperature, light, or barometric pressure sensor. The climate sensor modular unit may be used, for example, by a home inspector to measure humidity in a basement or crawlspace. Measurements from the climate sensor modular unit may be used to approximate altitude. In a particular embodiment of the present invention, the climate sensor modular unit is a NODE CLIMA as offered by Variable Technologies.

Other Modular Units

Various other modular units are contemplated and fall within the scope of this invention, including various sensors used to detect and measure environmental stimuli and data. For example, an actuator, an electromagnetic pulse detector, a range finder, and a motion detector could be used as modular units with the core device 10 and with the system and methods disclosed herein.

Measurement Computation and/or Display Device

Figure 3:
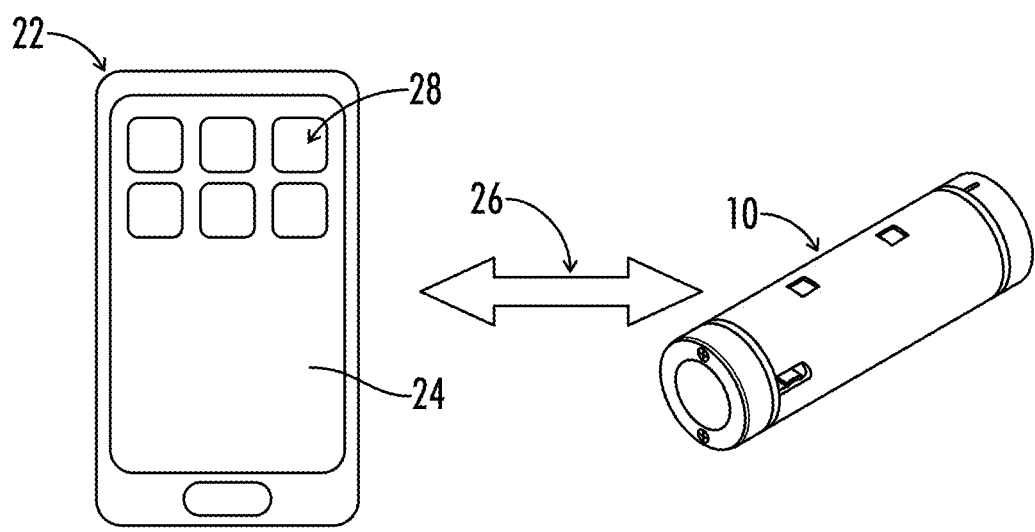
FIG. 3. shows the modular-multi functional portable device in communication with a mobile communication device.
Figure 4:
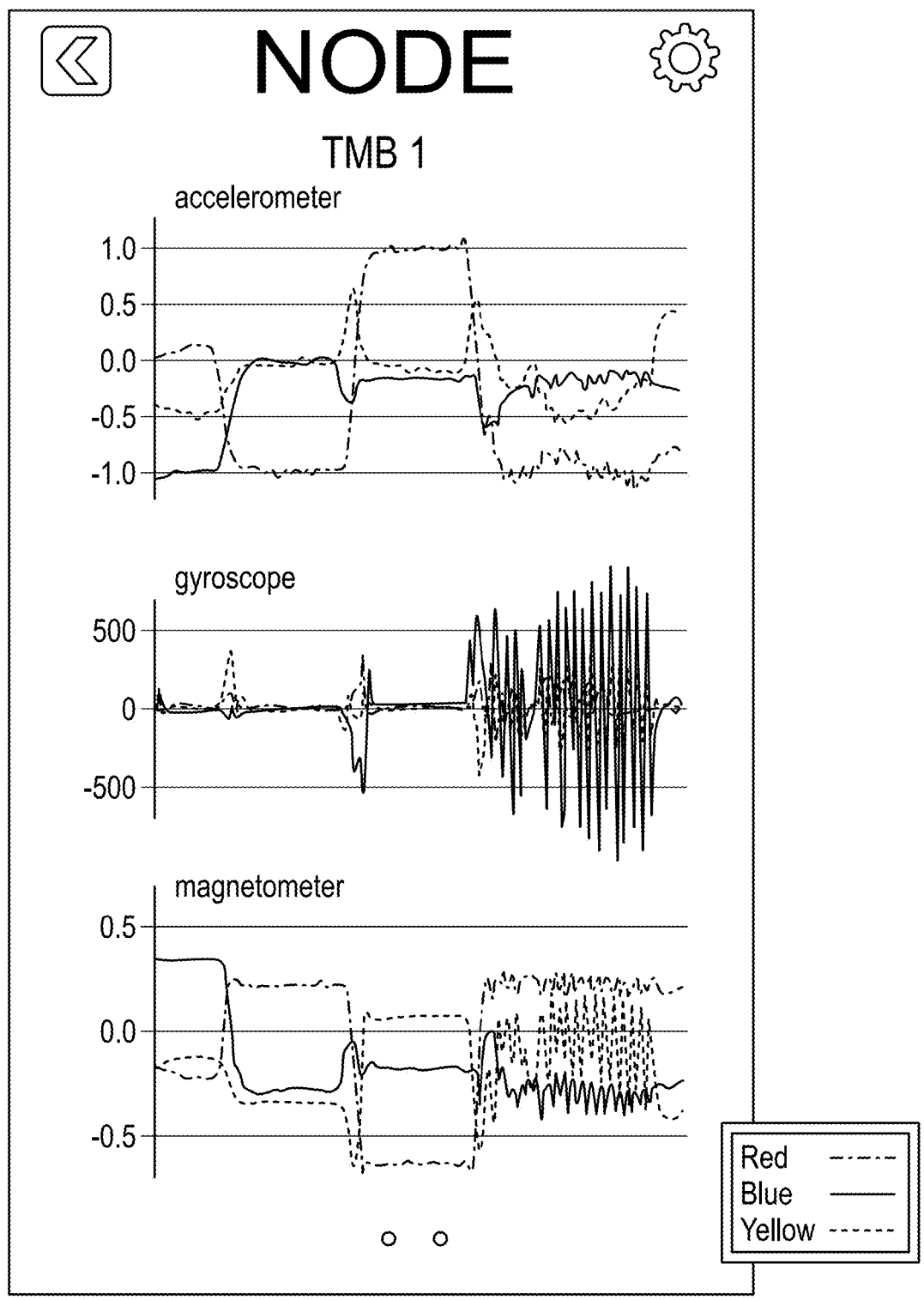
FIG. 4 depicts a screen shot of a display generated on a user computing device used in the present invention.
Figure 5:
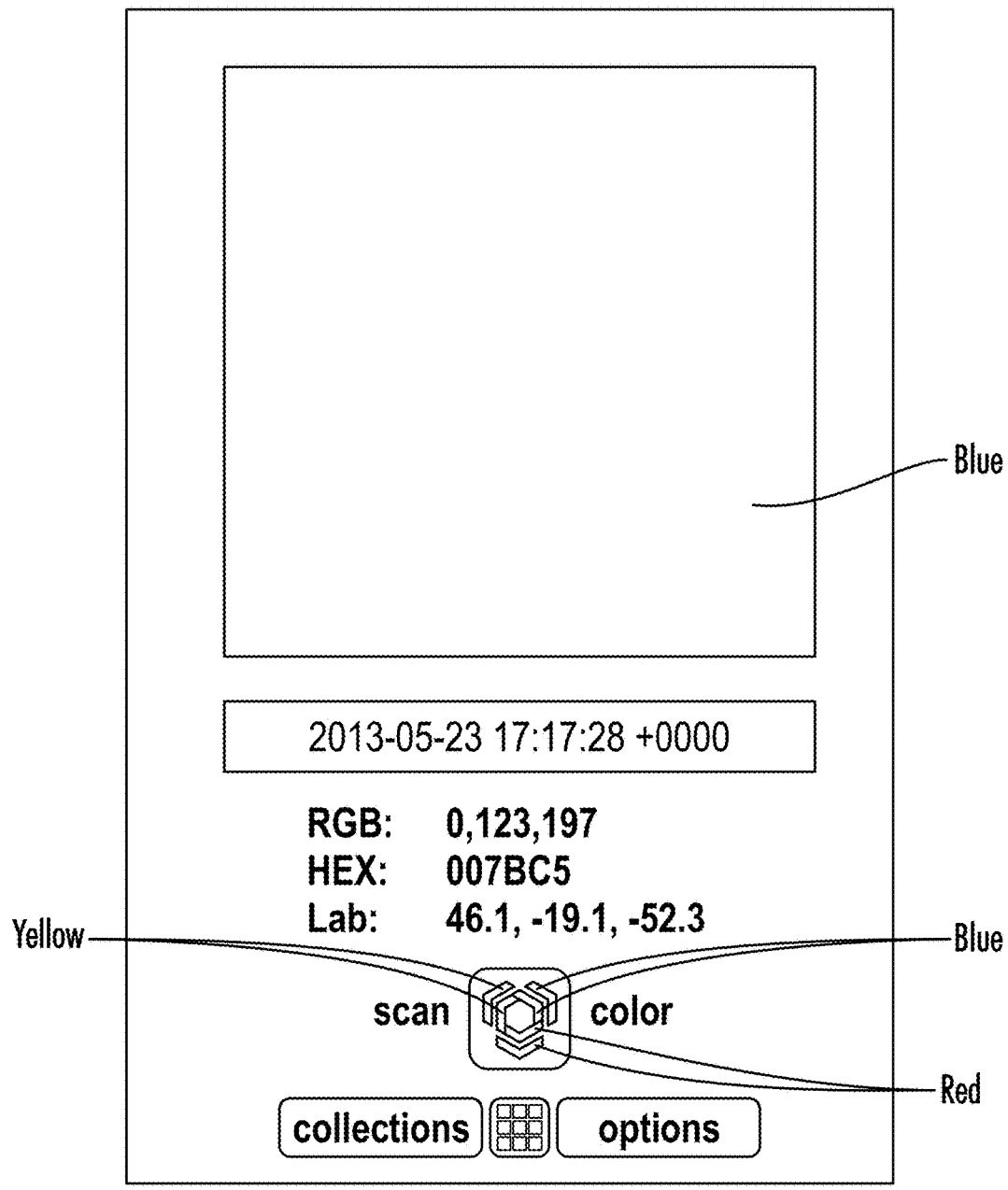
FIG. 5 depicts a screen shot of a display generated on a user computing device used in the present invention.
Figure 6:
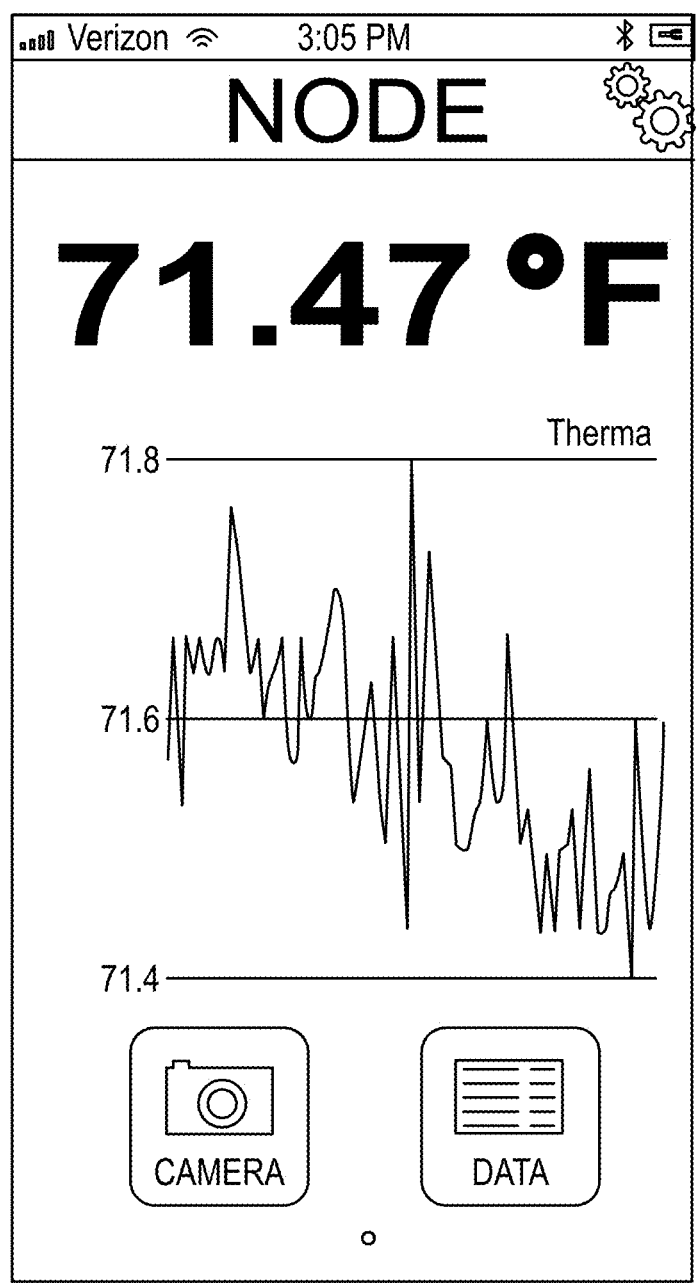
FIG. 6 depicts a screen shot of a display generated on a user computing device used in the present invention.
Figure 7:
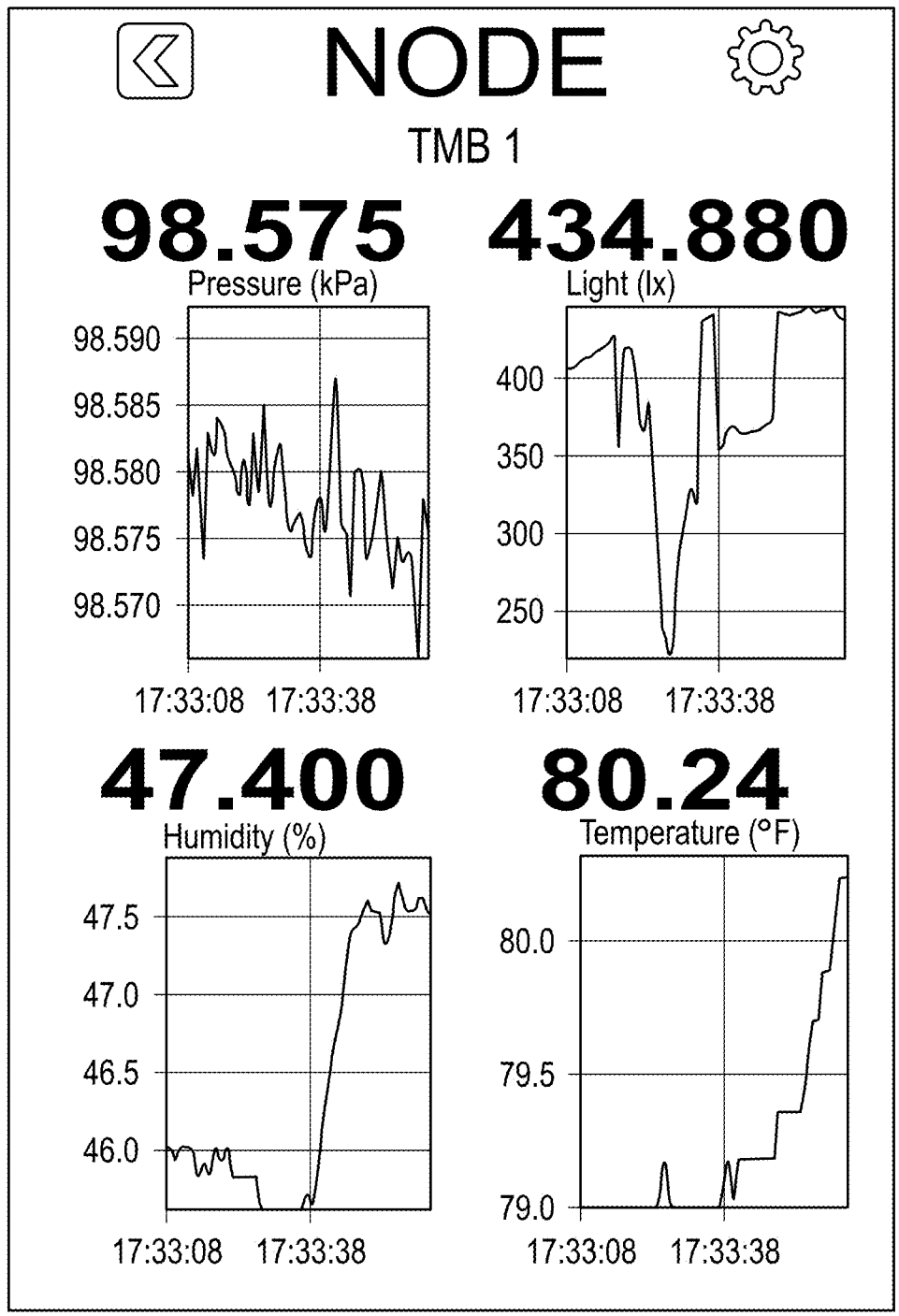
FIG. 7 depicts a screen shot of a display generated on a user computing device used in the present invention.

In one embodiment, the core device 10 of the present invention or a modular unit 16 may communicate or interface with a user computing device (also referred to as a "user computing device"), such as another device that may manipulate and/or display the data obtained by the core device or a modular unit. The user computing device may be any of a number of computing devices known in the art, such as mobile communication device, or a combination of a host server in combination with a local computing device in communication with the host server. The core device 10 may communicate with the user computing device over a wireless network to provide measurement data, for calibration, or to send various predetermined signals. For example, as shown in FIG. 3, the core device 10 may communicate with a mobile communication device 22 via a communications link 26 established over a communications network. The mobile communication device may be a smartphone/smart device (such as an Apple iPhone, Apple iPad, or Android device) or other similar device. As an example, the core device 10 may utilize a variety of known radio communication methods by isolating the lower level radio processes to the communications unit of the core device 10. It is contemplated that a radio in the communications unit may use a variety of common communication methods and established protocols to communicate with the core device controller or with the user computing device. The ability to use any common radio communication protocol allows for interchangeable radio standards. For example, many radio communication standards use a low power advertising packet to allow other devices to sense the availability of the radio device. In an embodiment, the present invention may utilize an advertising packet to also provide sensing information derived from the sensors to other nearby devices without requiring an established connection to the core device. By only sending advertising packets instead of requiring a connection, the power usage of the radio may be lowered.

The core device 10 may enable remote communications to and from a modular unit 16 and another device, such as the mobile communication device 22 or a host server. A modular unit 16 may also be configured to directly communicate with another device, such as the mobile communication device 22 or a host server.

The user computing device, such as a mobile communication device 22, may include a display 24. The user computing device may be configured to generate a graphical user interface ("GUI") 28 on the display 24. Measurement information obtained from the modular units 16 or the core device 10 may be displayed on the GUI 28. The GUI 28 displayed may be tailored to enable selection of various software modules. For example, a GUI may be generated that includes a plurality of icons, each icon associated with a respective one of a plurality of modular units and a particular software module. The user may then be enabled to select only one of a plurality of icons, such as an icon that is associated with a particular modular unit or a modular unit and core device combination. Upon user selection of a particular icon, a computer program product (as further described below) may be initiated that is associated with a particular combination. In one embodiment of the present invention, a user may be able to fully customize a graphical user interface by manipulation of an open application programming interface (API).

Computer Program Product

A computer program product may reside on the modular units, the core device, or the user computing device. According to one embodiment, the computer program product may typically comprise computer instructions residing on a non-transitory computer-readable medium. Alternatively, the computer program product may reside in a non-transitory computer-readable medium such as on the user computing device remote from the core device and modular units but communicatively linked to the core device and modular units such that execution of the computer program product directs the performance of various methods described herein, at least part of which includes steps for generating a user interface on a display and receiving user input regarding, e.g., various display parameters.

It will be understood by those of skill in the art that navigating between user interface views is accomplished by selecting a tab or object in a current user interface view corresponding to another user interface view, and in response to selecting the tab or object, the user interface updates with said another user interface view corresponding to the selected tab or object. It will be understood by those of skill in the art that providing data to the system or the user interface may be accomplished by clicking (via a mouse or touchpad) on a particular object or area of an object displayed by the user interface, or by touching the displayed object in the case of a touchscreen implementation.

In an exemplary embodiment, the computer program product is a smartphone application as provided by Variable Technologies, which enables many unique features. Screenshots of the functionality enabled by the display device are represented by reference to FIGS. 4-7.

Creation of a High Resolution Thermal Image

The device according to one embodiment of the present invention may be used to create a heat map by stitching or combining multiple low resolution thermal images to create a higher resolution thermal image. The device may use the inertial measurement unit to track the orientation of the device and provide data regarding the location of the device and its motion. The device may also use the thermal sensor unit to gather data related to emitted radiation.

Figure 8:
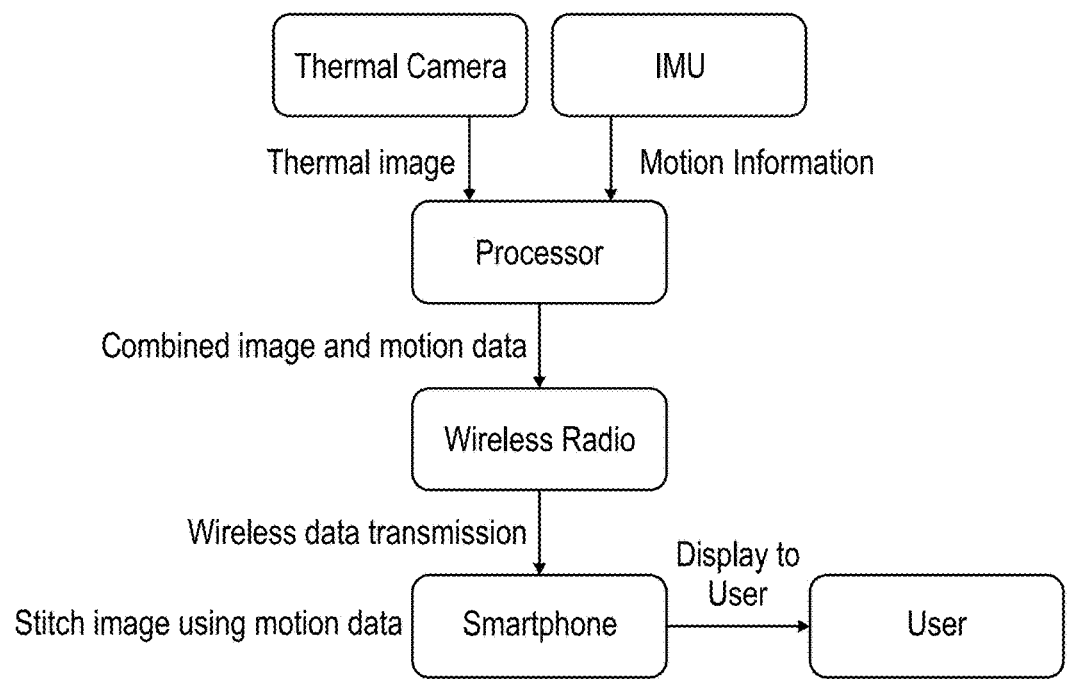
FIG. 8 is a flow chart illustrating a method according to the present invention.
Figure 9:
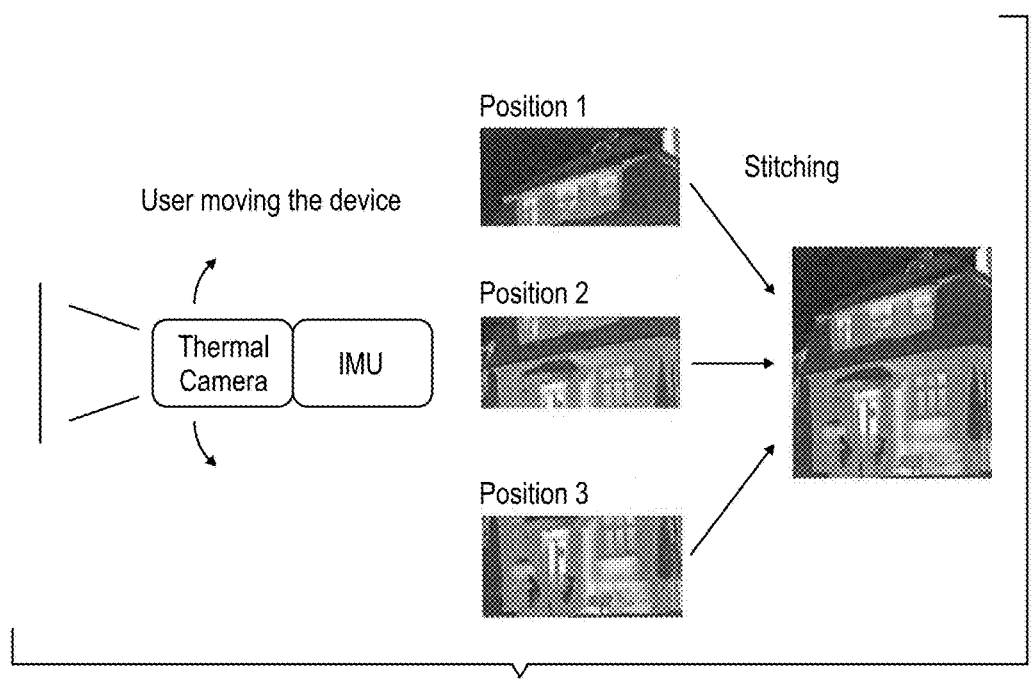
FIG. 9 illustrates an exemplary use of the thermal sensor modular unit and the inertial measurement unit of the invention to create a high resolution thermal image.

As illustrated in FIGS. 8-9, the location or motion data may be supplied to the processor along with data gathered from the thermal sensor unit. For example, the thermal sensor unit may include a thermal camera that captures low resolution thermal images as a user moves the wireless sensor device. By combining the location or motion data gathered from the inertial measurement unit with data gathered by the thermal sensor unit, the system can output a much higher resolution thermal image by stitching multiple images together.

Surveying Buildings and Landscapes

The device according to one embodiment of the present invention may also be used to survey buildings and landscapes. The device may use the inertial measurement unit to track the orientation of the device and provide data regarding the location of the device and its motion. The device may also use the laser range finder unit to determine distance and angles needed to survey an area.

Figure 10:
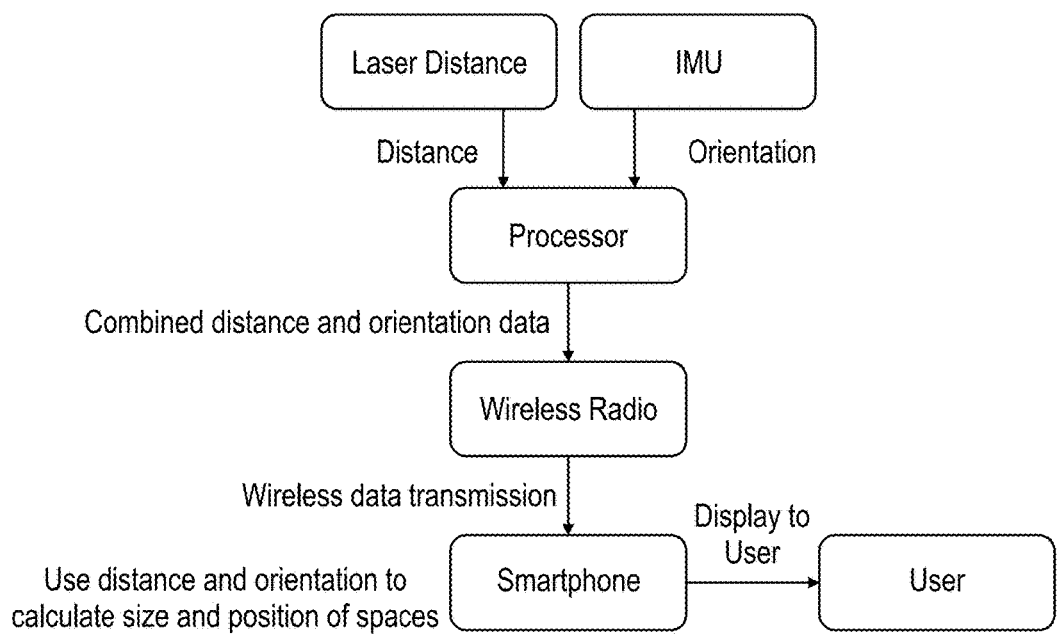
FIG. 10 is a flow chart illustrating a method according to the present invention.

As illustrated in FIG. 10, the location or motion data may be supplied to the processor along with data gathered from the laser range finder unit. The system can combine distance and orientation data to calculate the size and position of various targeted areas.

Vehicle Position Plus Environmental Data

Figure 11:
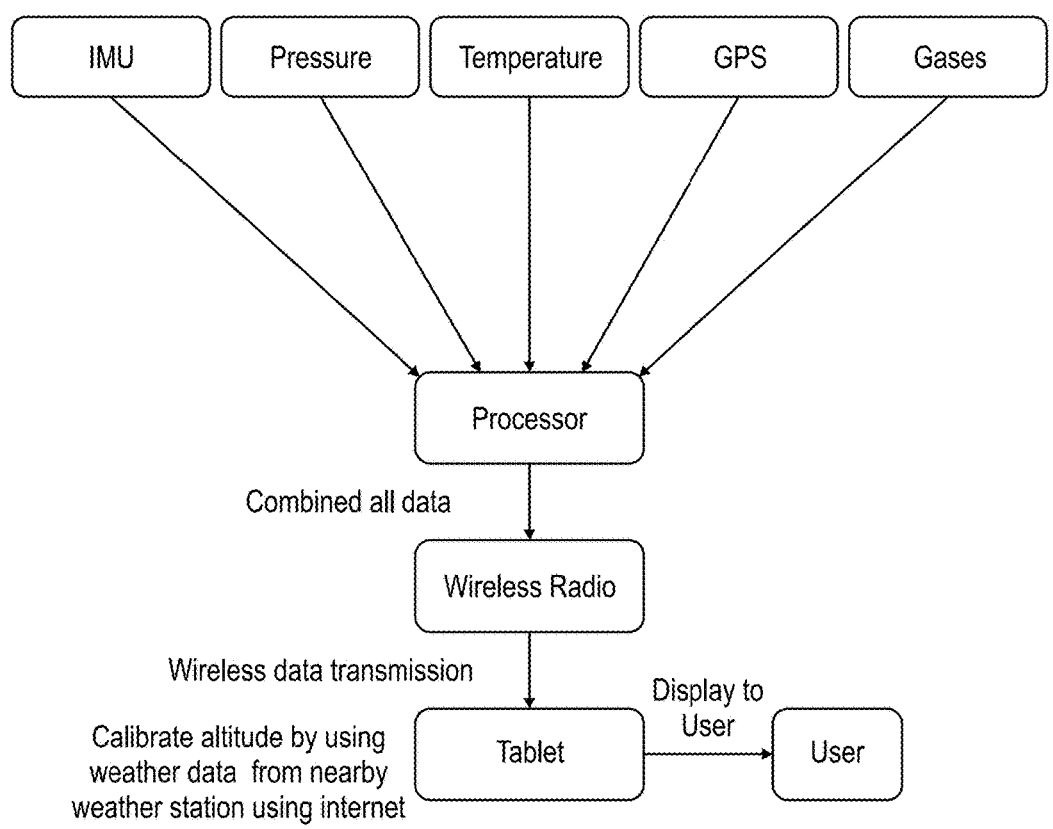
FIG. 11 is a flow chart illustrating a method according to the present invention.

The device according to one embodiment of the present invention may also be used to provide vehicle position and cabin safety information. The device may use a number of modular units to track the position of a vehicle, including a vehicle's altitude, GPS location, orientation, speed, and direction, and simultaneously use a number of modular units to gather cabin safety information, including temperature, oxygen level, and various toxic gas levels. As illustrated in FIG. 11, this type of data can be combined, used to calculate various targeted data and displayed to a user.

Lightning Strike Sensor Network

Figure 12:
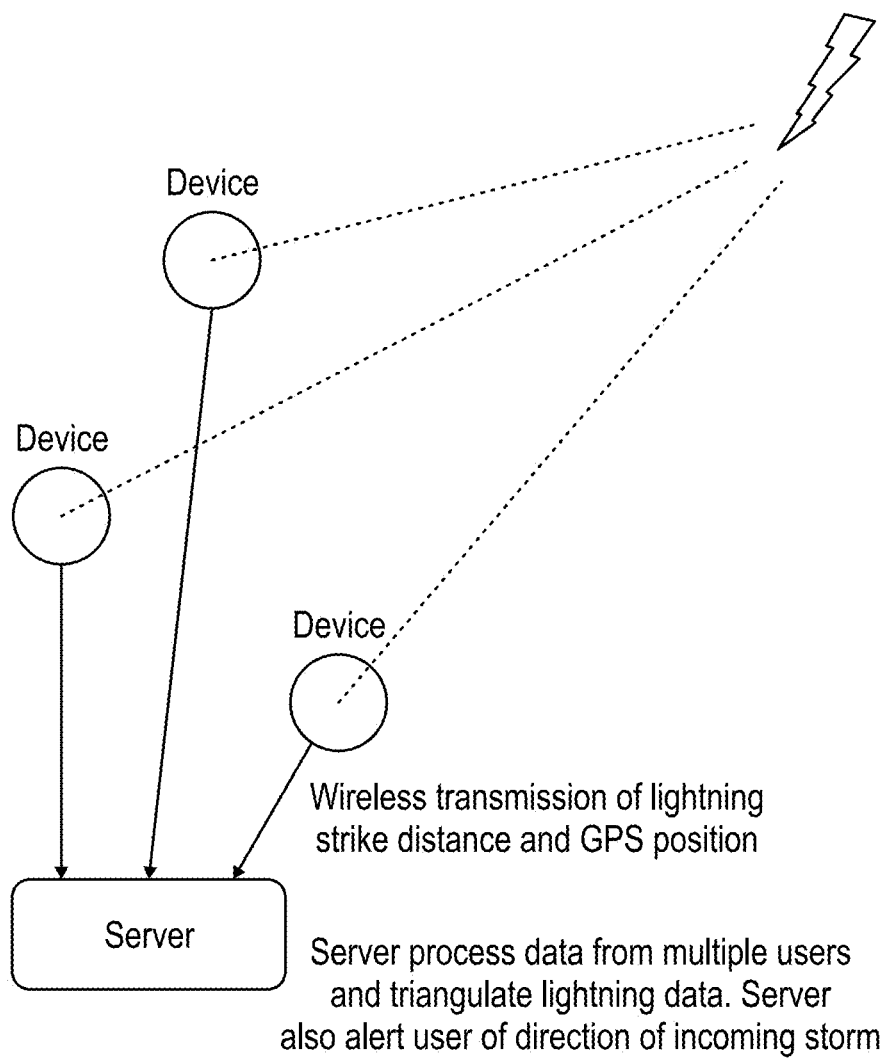
FIG. 12 illustrates the use of the invention to create a lightning strike network.

As shown in FIG. 12, the device according to one embodiment of the present invention may also be used to create a lightning sensor network. The system may use a modular unit to determine location (i.e. a GPS unit) and use another modular unit to detect electromagnetic pulse in order to determine the distance of various lightning strikes. The system can also determine position of incoming lighting storms using a network of core devices and/or modular units, worn or fix mounted and transmitting lightning strike time, distance data, and position via smartphones to a central controller.

Worker Monitoring Network

In yet another embodiment of the invention, the system can be used as a worker monitoring network. The core device and/or modular units can be worn by a worker and used to determine a worker's location. The system can also be used to track process parameters as the worker inspects processes and materials. Further, the system may be used to track environmental parameters that affect a facility as well as the working conditions of the workers at a facility.

Measurement of Color

As an example of a method of the present invention, in an embodiment, a color sensing method may include an algorithm for sensor calibration using a priori estimation. Due to the linearity of color sensing chips that may be used in various embodiments of the present invention including the color sensor modular unit, an a priori sensor calibration algorithm as represented in FIG. 13 enables the sensor to detect the tristimulus coordinates of colors with an average accuracy of 0.6%.

Figure 13:
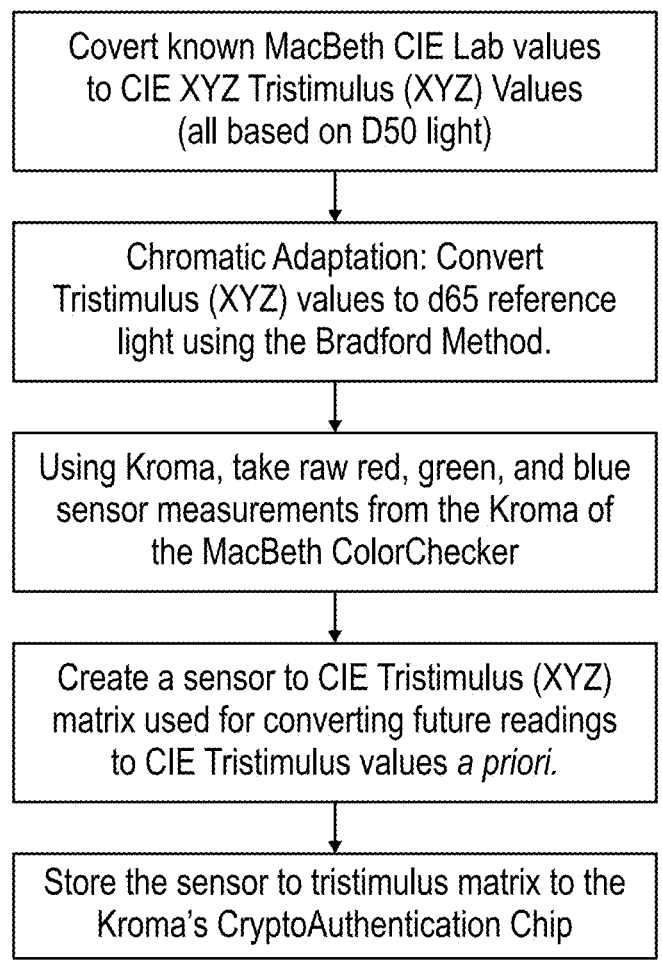
FIG. 13 is a flowchart illustrating an algorithm used to determine the color of a targeted area based on measurements taken by the portable electronic device of the present invention.

Alternatively or in addition to the a priori estimation process as represented in FIG. 13, a color sensing calibration process may be conducted using a database. Because of the consistency of the color sensor modular unit's color sensing (consistent to within 0.2% sensor readings for samples it has seen before) due to the use of a precise sensor and an isolated environment for light, a database of known color sense values can be created (on a smartphone or remotely available from, e.g., the internet) and compared against with high accuracy. Due to large memory spaces on some user computing devices used with the invention and available for a color sample history, this method can be used for a very large number of color samples.

Figure 14:
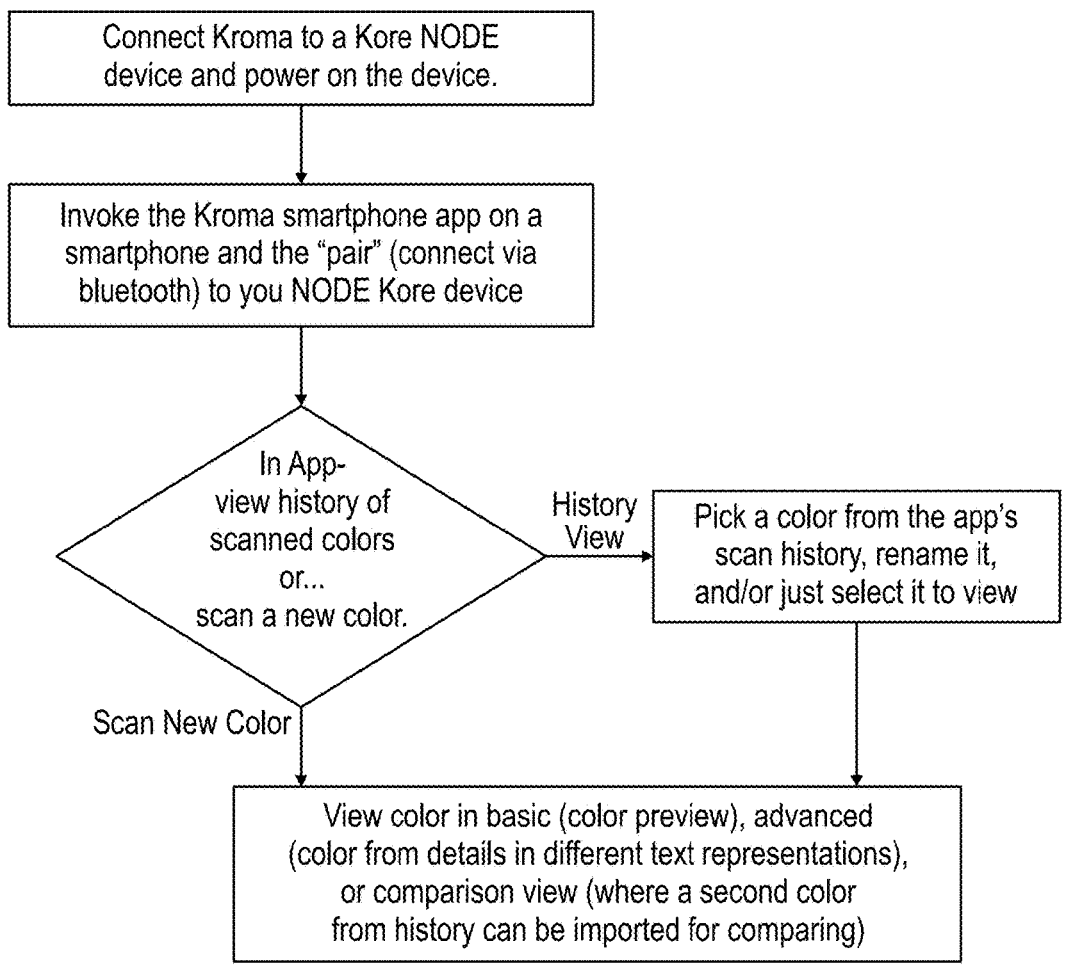
FIG. 14 is a flowchart illustrating steps taken when using the computer program product of the present invention to view stored data.

An exemplary color measurement algorithm according to an embodiment of a color sensing method of the present invention may be described as follows. First, a computer program product such as the Chroma smart phone application available from Variable Technologies (as executed from, e.g., an iPhone) requests a new color scan. A software library available on the user computing device may send a request over a communications network incorporating, e.g., Bluetooth technology and specifying the gain, prescaler, integration time, and LED (on/off/strength) settings. The core device receives the Bluetooth command and sends the appropriate commands to the color sensor modular unit. The core device may read back red, green, blue, and clear sense values from the color sensor modular unit along with that specific color sensor modular unit's calibrated sensor to tristimulus matrix from a CryptoAuthentication chip. The calibration matrix and raw sense values are sent over the wireless communications network (e.g., Bluetooth) to the user computing device, where they are converted to CIE XYZ, CIE Lab, and sRGB values for initial display and comparison. An exemplary operation of a computer program product residing upon or otherwise executable in association with the user computing device is as represented in the flowchart of FIG. 14.

This written description uses examples to disclose the invention and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

It will be understood that the particular embodiments described herein are shown by way of illustration and not as limitations of the invention. The principal features of this invention may be employed in various embodiments without departing from the scope of the invention. Those of ordinary skill in the art will recognize numerous equivalents to the specific procedures described herein. Such equivalents are considered to be within the scope of this invention and are covered by the claims.

All of the compositions and/or methods disclosed and claimed herein may be made and/or executed without undue experimentation in light of the present disclosure. While the compositions and methods of this invention have been described in terms of the embodiments included herein, it will be apparent to those of ordinary skill in the art that variations may be applied to the compositions and/or methods and in the steps or in the sequence of steps of the method described herein without departing from the concept, spirit, and scope of the invention. All such similar substitutes and modifications apparent to those skilled in the art are deemed to be within the spirit, scope, and concept of the invention as defined by the appended claims.

Thus, although there have been described particular embodiments of the present invention of a new and useful MODULAR MULTI-FUNCTIONAL DEVICE, METHOD, AND SYSTEM it is not intended that such references be construed as limitations upon the scope of this invention except as set forth in the following claims.

What is claimed is:

1. A modular multi-functional portable device comprising:
   a housing having an interior and an exterior;
   a connection port disposed on the exterior of the housing, the connection port having an electrical connector configured to interface with an electrical connector of one of a plurality of unique modular units;
   a controller disposed within the interior of the housing, the controller effective to receive a signal that identifies any single one of a plurality of unique modular units as being interfaced with the connection port, the controller effective to execute a unique calibration associated with a unique identifier of the single one of the plurality of unique modular units interfaced with the controller; and
   a communications unit disposed within the interior of the housing functionally linked to a communications network,
   wherein one of the plurality of unique modular units comprises a color sensing modular unit, and the unique calibration associated with the color sensing modular unit comprises
      receiving raw calibration measurements from the color sensing modular unit with respect to a color reference, and
      storing a unique sensor to CIE tristimulus matrix based on the raw calibration measurements for converting future readings a priori,
   wherein the unique calibration associated with the color sensing modular unit further comprises:

converting one or more known color values associated with the raw calibration measurements to tristimulus values;

adapting the tristimulus values to a reference light setting; and generating a tristimulus matrix for converting future readings of the color sensing modular unit to tristimulus values a priori, and wherein the modular multi-functional portable device is configured to adapt the tristimulus values to the reference light setting according to a D65 reference light.

2. The device of claim 1, further comprising an internal power source within the housing, the power source configured to provide power to the controller and the communications unit.

3. The device of claim 2, further comprising:

an external power source; and a charge port configured to receive electrical power from an external power source to charge the internal power source.

4. The device of claim 1, further comprising an inertial measurement unit located within the housing comprising a gyroscope, a magnetometer, and an accelerometer, and effective to measure nine degrees of freedom.

5. The device of claim 1, further comprising a switching element configured to activate and deactivate the portable device.

6. The device of claim 5, wherein the portable device further comprises a computer readable medium having software residing thereon, the software executable to enable or disable a low power sleep mode.

7. The device of claim 1, wherein the portable device further comprises an encrypted ID memory chip that stores identification and key calibration parameters corresponding to one or more unique modular units.

8. A system comprising:

a plurality of unique modular units each comprising an electrical connector and effective to generate a capability signal associated with a capability of the respective modular unit;

a multi-function portable device comprising:

a housing having an interior and an exterior;

a connection port disposed on the exterior of the housing, the connection port having one or more electrical connectors configured to interface with electrical connectors of one or more of the plurality of unique modular units;

a controller disposed within the interior of the housing, the controller effective to receive a unique identification signal from each of the one or more interfaced unique modular units, the controller effective upon receiving the unique identification signal from each of the one or more interfaced unique modular units to execute one or more unique calibrations associated with the capabilities of the respective modular units; and a communications unit disposed within the interior of the housing and functionally linked to a communications network, wherein one of the one or more interfaced unique modular units comprises a color sensing modular unit, and at least one of the one or more unique calibrations associated with the color sensing modular unit comprises receiving raw calibration measurements from the color sensing modular unit with respect to a color reference, and storing a unique sensor to CIE tristimulus matrix based on the raw calibration measurements for converting future readings a priori, wherein the one or more unique calibrations associated with the color sensing modular unit further comprises:

converting one or more known color values associated with the raw calibration measurements to tristimulus values;

adapting the tristimulus values to a reference light setting; and generating a tristimulus matrix for converting future readings of the color sensing modular unit to tristimulus values a priori, and wherein the multi-function portable device is configured to adapt the tristimulus values to the reference light setting according to a D65 reference light.

9. The system of claim 8, wherein the multi-function portable device further comprises an inertial measurement unit located within the housing comprising a gyroscope, a magnetometer, and an accelerometer, and effective to measure nine degrees of freedom.

10. The system of claim 8, wherein the multi-function portable device further comprises:

an internal power source within the housing, the power source configured to provide power to the microcontroller and the communications unit; and a charge port configured to receive electrical power from an external power source to charge the internal power source.

11. The system of claim 8, wherein the modular unit further comprises a chip that enables restricting use of the modular unit.

12. The system of claim 8, wherein the modular unit further comprises a chip that enables storage of unique calibration information for each modular unit.

13. The system of claim 8, wherein the modular unit comprises a transceiver.

14. The system of claim 8, wherein the communications unit is effective to send and receive encrypted communications.

15. The system of claim 8, wherein the controller of the portable device is configured to execute one unique set of instructions based on the identification of a particular combination of two or more of the plurality of modular units coupled to the portable device.

16. A method of calibrating data associated with a sensor connected to a modular multi-functional portal device, the method comprising:

connecting a first sensing device and a second sensing device to a housing of the modular multi-functional portable device;

recognizing a unique identifier associated with at least one of the first and second sensing devices, wherein the unique identifier uniquely identifies a single one of the first and second sensing devices;

determining at least one set of unique calibration data associated at least one of the first and second sensing devices according to the recognized unique identifier;

executing a unique calibration associated with at least one of the first and second sensing devices based on the determined at least one set of unique calibration data; and determining a sensor output value based at least in part upon measured sensor data and the executed calibration corresponding to the determined at least one set of unique calibration data, wherein one of the first sensing device and the second sensing device comprises a color sensing modular unit, and wherein the executing the unique calibration associated with the color sensing modular unit comprises
- receiving raw calibration measurements from the color sensing modular unit with respect to a color reference, and
- storing a unique sensor to CIE tristimulus matrix based on the raw calibration measurements for converting future readings a priori, wherein the unique calibration associated with the color sensing modular unit further comprises:
- converting one or more known color values associated with the raw calibration measurements to tristimulus values;
- adapting the tristimulus values to a reference light setting; and
- generating a tristimulus matrix for converting future readings of the color sensing modular unit to tristimulus values a priori, and wherein the modular multi-functional portable device is configured to adapt the tristimulus values to the reference light setting according to a D65 reference light.

17. The method of claim 16, wherein the determining at least one set of unique calibration data comprises obtaining the at least one set of unique calibration data from an internal memory of a modular unit comprising at least one of the first and second sensing devices.

18. The method of claim 16, wherein:
- the second sensing device is connected to the modular multi-functional portable device after the first sensing device is connected to the modular multi-functional portable device,
- the first sensing device is calibrated according to at least one set of unique calibration data corresponding to a unique identifier of the first sensing device, and the second sensing device is calibrated according to at least one set of unique calibration data corresponding to a unique identifier of the second sensing device, and
- the unique identifier of the first sensing device uniquely identifies the first sensing device and the unique identifier of the second sensing device uniquely identifies the second sensing device.

\* \* \* \* \*